United States Patent [19]

Jasovsky et al.

[11] 4,255,461

[45] Mar. 10, 1981

[54] PREPARATION OF A DECAFFEINATED ROASTED COFFEE BLEND

[75] Inventors: George A. Jasovsky, Bayonne; Martin Gottesman, Paramus, both of N.J.

[73] Assignee: General Foods Corporation, White Plains, N.Y.

[21] Appl. No.: 93,787

[22] Filed: Nov. 13, 1979

[51] Int. Cl.³ .............................................. A23F 5/20
[52] U.S. Cl. .................................. 426/595; 426/427; 426/388
[58] Field of Search ....................... 426/388, 427, 595

[56] References Cited

U.S. PATENT DOCUMENTS

| 3,640,726 | 2/1972 | Bolt et al. | 426/595 |
| 3,767,418 | 10/1973 | Ponzoni | 426/461 |
| 3,840,684 | 10/1974 | Fazzina et al. | 426/427 X |
| 3,843,824 | 10/1974 | Roselius et al. | 426/427 X |

FOREIGN PATENT DOCUMENTS 926693  5/1973  Canada .

*Primary Examiner*—Joseph M. Golian
*Attorney, Agent, or Firm*—Thomas R. Savoie; Daniel J. Donovan

[57] ABSTRACT

A lower-grade green coffee bean fraction is moisturized to above 37% by weight and then decaffeinated by extraction with a moist supercritical fluid having a temperature of at least 100° C. This decaffeinated coffee is then combined, either before or after roasting, with a higher-grade coffee fraction. Typically the higher-grade fraction will be coffee which has been decaffeinated by extraction with a moist supercritical fluid at a temperature below about 85° C.

5 Claims, No Drawings

PREPARATION OF A DECAFFEINATED ROASTED COFFEE BLEND

TECHNICAL FIELD

There has been a long felt need in the art to produce a decaffeinated, roasted coffee which has the flavor and aroma of non-decaffeinated, roasted coffee. To date most, if not all, of the commercially available decaffeinated coffees have been prepared via directly contacting green coffee beans with an organic solvent such as methylene chloride, such as described in U.S. Pat. No. 3,671,263 to Patel et al., or a caffeine-deficient water solution of green coffee solubles, such as disclosed in U.S. Pat. No. 2,309,092 to Berry et al. While these techniques have produced products which have achieved a degree of acceptance in the marketplace, a significant percentage of the coffee users find the flavor and aroma of these decaffeinated coffee products to be noticeably different and less preferred than non-decaffeinated coffee products.

Recently there has been disclosed a technique for decaffeinating green coffee in which green beans are decaffeinated via direct contact with moist supercritical carbon dioxide at a temperature between 40° and 80° C. and a pressure between 120 and 180 atmospheres. This procedure produces decaffeinated coffee which is nearly the same as its non-decaffeinated counterparts in terms of flavor, aroma and chemical composition (except for the absence of caffeine). It has also been disclosed, such as in U.S. Pat. No. 3,843,824 to Roselius et al., that other supercritical fluids such as $SF_6$, $CHF_3$, $CHF_2Cl$, $CF_3Cl$ and $C_3F_8$ are equally effective in removing caffeine from coffee material. Thus, it may now be possible to produce decaffeinated roasted and ground (or otherwise comminuted) coffee and decaffeinated soluble coffee products which are equally preferred to their non-decaffeinated counterparts.

Typically when preparing a coffee product, either a soluble or roasted and ground product, a blend of different coffee varieties is employed as the raw material. In this manner a particular desired flavor profile can be produced by combining in various proportions several different coffee components, each having differing flavors; it will also be possible to take advantage of whatever pricing differential that might exist between coffees of differing types. While many coffee blends utilize an amount of low-grade coffee such as Robusta, the level of usage must be limited in spite of their traditionally low cost. This is because the exceptionally strong flavor characteristics of Robusta coffees and certain other low-grade, coffees is not very acceptable to consumers. Several techniques have, however, been found to upgrade the flavor quality of Robusta coffee so that higher levels of lower cost coffees could be used to formulate coffee blends without objectionally changing the taste characteristics of coffee brews prepared therefrom. U.S. Pat. Nos. 3,767,418 to Ponzoni et al. and 3,640,726 to Bolt et al. disclose use of a steaming step prior to a roasting step in order to upgrade Robusta coffee.

It has been disclosed in the prior art, U.S. Pat. No. 3,840,684 to Fazzina et al., that it may be desirable to use differing decaffeination techniques on "high-grade" and "low-grade" coffee components in order to maximize the preservation of flavor in the high-grade coffee and to remove considerable amounts of non-caffeine materials associated with the disadvantageous flavor characteristics of the low-grade coffee. Specifically this patent discloses decaffeinating a higher-grade green coffee fraction with organic solvents at lower temperatures while using a caffeine-deficient solution of green coffee solubles at high temperatures to decaffeinate lower-grade green coffee fraction.

DISCLOSURE OF THE INVENTION

This invention relates to new and improved processes for blending decaffeinated low-grade coffee with non-decaffeinated or decaffeinated high-grade coffee which blends upon percolation, produce superior tasting coffee brews. More particlarly, the invention is concerned with making a blend of a higher-grade coffee component which has not been decaffeinated or which has been decaffeinated via contact with a supercritical fluid at below 90° C. and a lower-grade coffee component which has been decaffeinated via contact with a supercritical fluid at a temperature of at least about 100° C.

In general, what is meant by "high grade" coffee is good quality Arabica coffees such as Santos and Milds, with the Santos coffees being relatively non-aromatic or neutral flavored in the coffee group, while the Mild coffees are very fragrant and acidy when they are of the high-grown type and somewhat thinner in aroma and body when of the "low-grown" type. On the other hand, what is meant by "low-grade" coffee is the cheaper coffee such as Robusta, unwashed Arabicas and other coffees generally considered to have poor flavor characteristics.

According to the process of this invention a low-grade green coffee component which may be either in the whole bean or comminuted state is moisturized to a level of between 37 and 50% by weight. Conventional steaming and/or prewetting steps well-known to those skilled in the decaffenation art are suitable for this purpose. Typically this low-grade component will contain a majority, up to 100%, Robusta coffee. This moisturized coffee is then decaffeinated preferably at a temperature between 100° and 160° C. and a pressure of between 200 and 450 atmosphere by means of contact with a water-saturated supercritical fluid, preferably carbon dioxide. The decaffeinated low-grade component is dried and then combined, usually at a level of between 30 and 80% by weight, either before or after roasting, with a high-grade coffee component. If only a partially decaffeinated coffee product is (i.e., about 50 to 70% decaffeinated) desired it would be possible to use a non-decaffeinated high-grade component. If a fully decaffeinated coffee product is desired (i.e., above 90% decaffeinated) then a decaffeinated high-grade component must be employed.

According to this invention, decaffeination of the high-grade coffee component is effected by moistening the green coffee to a level of between 26 and 33% by weight and then decaffeinating the moistened coffee at a temperature between 60° C. and 85° C. and a pressure of at least 200 atmosphere by means of contact with a water-saturated supercritical fluid, preferably carbon dioxide. Typically the high-grade component will contain a majority, up to 100% of good quality Milds coffee.

As will be appreciated by those skilled in the art, the coffee blends proposed in accordance with this invention may be used in the production of either soluble or roasted and brewable coffee products. These products will produce beverages which have a flavor and aroma quite comparable to non-decaffeinated counterparts prepared from or same equivalent blend of green coffees.

BEST MODE FOR CARRYING OUT THE INVENTION

Several comparisons have been mde which show the benefit of decaffeinating Robusta coffee in accordance with this invention. Examples 1 and 2 show that increased consumer preference is obtained by separately decaffeinating low-grade Robusta coffee with supercritical carbon dioxide at high moistures and temperatures and high grade coffee at lower more conventional moistures and temperatures versus a procedure wherein all of the coffee is decaffeinated with supercritical carbon dioxide at conventional moistures and pressures.

EXAMPLE 1

Two separately decaffeinated roasted and ground coffees were obtained for taste comparison with a water-decaffeinated, roasted and ground coffee product produced in accordance with the aforementioned Berry et al, patent. Using comparable equipment and procedures, batches of Colombian, Brazilian and Robusta green coffee beans were separately decaffeinated by first moisturizing green coffee beans to 30% weight and then contacting the moisturized coffee with a stream of supercritical $CO_2$ at conditions of 80° C. nd 250 atmospheres until about 97% of the caffein was removed. The thus decaffeinated coffees were then dried to between 10 and 14% moistures and subsequently were separately roasted with the Colombian coffees being split into two fractions and with each fraction being roasted to comparable but discernably different roast colors. A portion of the green Robusta coffee beans employed above was separately moisturized to 45% water by weight and then contacted with a stream of supercritical $CO_2$ at conditions of 100° C. and 250 atmospheres. These decaffeinated Robusta beans were then roasted to color comparable to above roasted Robusta beans. Two separate roasted coffee blends were formulated each consisting on a weight basis of 30%, Colombians (15% each roast color) 15% Brazilian and 55% Robusta with Blend A containing the Robustas decaffeinated at 80° C. and Blend B containing the Robustas decaffeinated at 100° C. Blends A and B were ground and brewed and the resulting beverage was compared to a control beverage prepared from a decaffeinated roasted and ground coffee decaffeinated in accordance with the aforementioned Berry et al, patent and containing 55% Colombian coffees and 45% Robusta coffees. In consumer taste tests Blend A lost to the control (46.5% to 53.5%) while Blend B was preferred to the control 52% to 48%.

EXAMPLE 2

Using the roasted coffees decaffeinated in Example 1 a Blend C was prepared combining 25% Columbians (15% and 10% separate roast colors) 10% Brazilian and 65% Robusta decaffeinated at 100° C. Blends A and C were ground and brewed and the resulting beverage was compared to a control beverage prepared from a non-decaffeinated roasted and ground coffee containing 30% Columbian, 40% Brazilian and 30% Robusta coffees. In consumer taste tests Sample A lost to the control (45.3% to 54.7%) while sample C was preferred to the control (54.7% to 45.3%).

Having thus described the invention what is claimed is:

1. A method of preparing a roasted coffee blend comprising the steps of:
    (a) moisturizing a lower-grade green coffee fraction to a moisture level of between 37 and 50% by weight,
    (b) decaffeinating the moisturized coffee of step (a) by contact with a stream of a moist supercritical fluid at a temperature of at least 100° C. and a pressure of at least 200 atmospheres,
    (c) combining the decaffeinated, lower-grade coffee fraction at a weight level of between 30 and 80% either before roasting with a higher grade green coffee fraction or after roasting with a higher grade roast coffee fraction.

2. The method of claim 1 wherein a higher-grade green coffee fraction has been decaffeinated by first being moisturized to between 26 and 33% by weight and then being contacted with a stream of a moist supercritical fluid at a temperature of between 60° C. and 85° C. and a pressure of at least 200 atmospheres.

3. The method of claim 2 wherein both higher-grade and lower-grade green coffee fractions are decaffeinated by contac with supercritical carbon dioxide.

4. The method of claim 3 wherein the lower-grade coffee fraction contains a majority of Robustas coffee.

5. The method of claim 3 wherein the lower-grade coffee fraction consists of Robusta coffee.

* * * * *